S. S. MATTHES.
WIRE SUPPORT.
APPLICATION FILED JUNE 11, 1920.
1,367,618.
Patented Feb. 8, 1921.
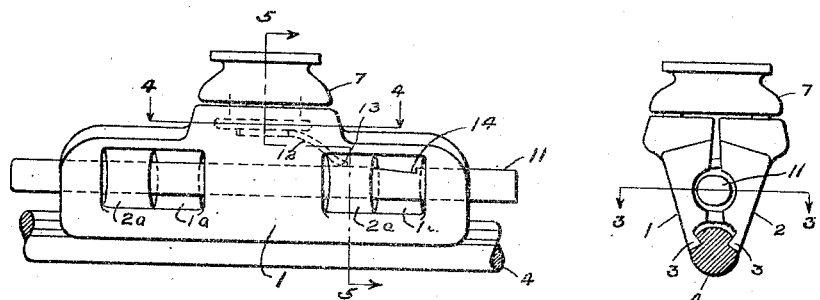
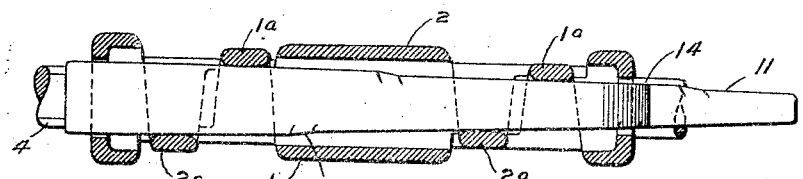
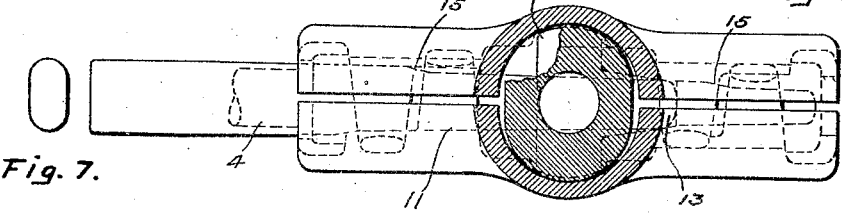
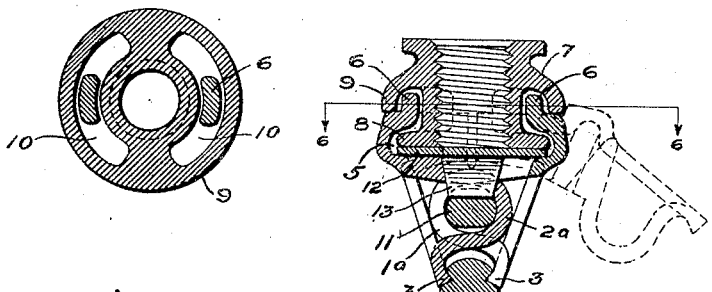
Inventor
Samuel S. Matthes.
Witness
H. J. Stromberger.
By
[signature]
Attorney

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

WIRE-SUPPORT.

1,367,618.  Specification of Letters Patent.  Patented Feb. 8, 1921.

Application filed June 11, 1920. Serial No. 388,111.

*To all whom it may concern:*

Be it known that I, SAMUEL S. MATTHES, a citizen of the United States, residing at Mansfield, in the county of Richland and State of Ohio, have invented certain new and useful Improvements in Wire-Supports, of which the following is a specification.

My invention relates to supports for conductors, especially those to support trolley wires. It has for its object a simple clamping device to be secured to a hanger and permit alining with the wire and to grip and securely hold the wire.

In the drawings accompanying the specification, Figure 1 shows a side elevation view of my clamp assembled to a wire and internal arrangement of the spring wedge lock.

Fig. 2 shows an end view of the clamp shown in Fig. 1.

Fig. 3 shows a section view on the line 3—3 of Fig. 2 and the relation of the wedge member and clamping jaws when gripping a wire.

Fig. 4 shows a top view in part section on the line 4—4 of Fig. 1 and shows the relation of the wedge and clamping jaws when the clamp is released from the wire and arrangement of the spring lock for the wedge.

Fig. 5 is a section on the line 5—5 of Fig. 1 and shows the relation of the parts when in an assembled position upon a trolley wire and also shows the interlocked engagement of the jaws with the boss member and the wedge lock.

Fig. 6 is a section on the line 6—6 of Fig. 5 and is another view showing the interlocking of the jaw members with the boss or support to allow for partial relative rotation of the support and jaws.

Fig. 7 is an end view of the large end of the wedge member.

Fig. 8 is a side view of the right hand end of the wedge in Fig. 3 to show the locking notch thereon.

My invention, which is shown in the preferred form in the accompanying drawings and herein described, consists of a pair of clamping members indicated by the numerals 1 and 2. As shown, these clamping members are not complementary parts. Each clamping member is provided with a plurality of loops $1^a$ and $2^a$ respectively and which are arranged alternately in respect to each other when the clamping members are properly positioned as in Fig. 4. At the lower edge of the clamping member, proper means 3 is provided for gripping a trolley wire 4. Near the upper end of each clamping member there is formed a semi-circular recess 5 and at the extreme upper end is a locking lug 6.

To support the clamp to an overhead insulator or other hanger I provide a boss or supporting member 7 which is internally threaded to engage a threaded stud on the hanger. At the lower end of the boss or supporting member is a circular flange 8 which is positioned in the recess 5 in the clamping members. About the middle of the supporting member is an overhanging flange 9 which has in its lower face two slots 10 and each slot is adapted to engage one of the lugs 6 on the clamping member. This construction permits a relative rotative movement of the clamping members and supporting member and the amount of such movement depends upon the length of the slot 10.

In order to assist in holding the parts in an assembled condition and also to move the jaws into and out of engagement with a trolley wire, I provide a wedge member 11 adapted to engage with the loop members $1^a$ and $2^a$. This wedge member is practically round at the small end and oval at the large end as indicated in Fig. 7. This particular shape is not necessary but it tends to simplify the construction and reduce the size of the device. The edges of my wedge are shown to be constructed in the form of steps and such steps are alternately placed on the two edges of the wedge and with reference to the loops which they engage. This particular construction of the edges of the wedge is not necessary but I prefer the same as it has certain advantages over a straight edge tapering wedge and which advantages will be explained later herein.

During the operation of assembling the clamping members and the supporting member, the spring 12 is inserted in position. To prevent the wedge member from being disengaged and to lock the parts against disengagement I employ a spring member 12 having one end anchored to the clamping members in the recess 5 and the other end 13 engaging a notch 14 in the wedge. The spring end 13 bears constantly against the upper side of the wedge and when the wedge is withdrawn to the limit desired the notch 14 is engaged and further withdrawal is stopped.

In order to assemble my device the clamping members are positioned upon the supporting member by inserting the lug 6 into the groove formed by the flanges 8 and 9 and at an angle as indicated by the dotted line in Fig. 5. The clamping member is then brought down into its normal position and the lug 6 will engage with the slot 10 and the flange 8 will engage with the recess 5 of the clamping member. When the two jaws have been thus positioned upon the supporting member the wedge member is inserted through the space formed by the loop members thereby locking the clamping members and the supporting member together.

To install my device upon a wire and overhead hanger, the supporting member is secured to the hanger (not shown) by rotating the whole device with the threads of the supporting member engaging the threaded stud of the hanger. This rotation is secured by rotating the clamping members which in turn rotates the supporting member 7 through the medium of the lugs 6 acting as a driving means and engaging one end of the slot 10. When the member 7 is in proper position respecting the hanger, the clamping members are rotated backward sufficiently to bring them into proper alinement with the trolley wire. This reverse rotation of the clamping members does not disengage or disturb the relation of the supporting member with respect to the hanger as the length of the slot 10 permits of such operation. Should, however, the reverse rotation be carried far enough the support member will be disengaged from the hanger. The jaws 3 are now made to engage the trolley wire and the wedge driven into the clamp thereby drawing the clamping members in gripping engagement with the trolley wire until the proper pressure is secured and simultaneously moving the clamping members into engagement with the support member and locking the parts against rotation.

By having the edges of the wedge made with steps 15 it is found possible to give the clamping members a greater range of opening and closing of the jaws than if the edges were of uniform taper from end to end. When the wedge is fully withdrawn to the stop position the lugs 1ª and 2ª will come opposite the depression in advance of the step 15, permitting the jaws to open to their limit and much farther than if the wedge were uniform and almost immediately upon forcing the wedge inward it begins to act upon the lugs to clamp the larger size wire. The portion of the wedge edges between the steps and to either side thereof is tapered thereby giving the effect of wedge action.

I am aware that from the description herein and the drawings accompanying this specification that others skilled in the art will be able to modify the construction herein disclosed but all such modification which comes within the scope of my invention I claim as follows:

Claims—

1. A wire support comprising means to grip a wire, supporting means having a limited relative rotative movement with respect to the gripping means, means to limit the relative rotative movement and means to secure the support to a hanger.

2. A wire support comprising means to grip a wire, supporting means having a limited relative rotative movement with respect to the gripping means, means to secure the supporting means to a hanger and means to rotate the supporting means into engagement with a hanger when the gripping means is rotated and permitting reverse rotation of the gripping means without rotating the supporting means.

3. A wire support comprising means to grip a wire, supporting means, means to secure the support to a hanger, means on the gripping means to engage means on the supporting means for rotating the supporting means into engagement with the hanger when the gripping means is rotated and permitting relative rotation of the gripping means without rotating the supporting means.

4. A wire support comprising means to grip a wire, supporting means having a limited relative rotative movement with respect to the gripping means, means to secure the supporting means to a hanger and means limiting the relative rotation of the gripping means with respect to the supporting means in either direction but permitting a relative rotation of the two elements between the aforesaid limits.

5. A wire support comprising means to grip a wire, supporting means having a limited relative rotative movement with respect to the gripping means, means to limit the relative rotative movement, means to force the gripping means into a holding engagement with the wire and means to secure the support to a hanger.

6. A wire support comprising means to grip a wire, supporting means having a limited relative rotative movement with respect to the gripping means to secure the device to a hanger and aline with respect to the wire, means to limit the relative rotative movement, means to move the gripping means into a holding engagement with the wire and simultaneously lock the gripping means and the support against relative rotative movement and means to secure the support to a hanger.

7. A wire support comprising means to grip a wire, supporting means having a limited relative rotative movement with respect to the gripping means, means to limit the rotative movement, a wedge member adapted to force the gripping means into a holding engagement with the wire and means to secure the support to a hanger.

8. A wire support comprising means to grip a wire, a supporting member engaging the gripping means and having a rotative movement relative to the gripping means, coacting means on the two elements for locking the two parts together against disengagement and limiting the amount of relative rotative movement and means for engaging a hanger.

9. A wire clamp comprising clamping means to grip a wire, operating means for moving the clamping means into gripping engagement with the wire, a resilient member and means for engaging the resilient member and coacting therewith to prevent disengagement of the operating means and the clamping means when the operating means is inactive.

10. A wire clamp comprising clamping means to grip a wire, operating means for moving the clamping means into gripping engagement with the wire, a resilient member interposed between the clamping means and the operating means to prevent disengagement of the operating means and means to engage a hanger or support.

11. A wire clamp comprising clamping means to grip a wire, operating means for moving the clamping means into gripping engagement with the wire, supporting means for engaging the clamping means and securing it to a hanger, a resilient member interposed between the operating means and the other elements to prevent disengagement of the operating means and means to engage a hanger or support.

12. A wire clamp comprising clamping means to grip a wire, a supporting member engaging the clamping means and having a rotative movement relative to the clamping means, coacting means on the two elements for locking the parts together against disengagement and limiting the amount of relative rotative movement and operating means to move the clamping means into gripping engagement with the wire.

13. A wire clamp comprising means to grip a wire, a supporting member engaging the clamping means and having a rotative movement relative to the clamping means, coacting means on the two elements for locking the parts together against disengagement and limiting the amount of relative rotative movement, operating means to move the clamping means into gripping engagement with the wire, means interposed between the operating means and the other element to prevent disengagement of the operating means and means to attach the clamp to a hanger or support.

14. A wire clamp comprising a pair of clamping members to grip a wire, and having alternately disposed loop members, a wedge member engaging the loop members to move the clamping members into gripping engagement with the wire, the opposite edges of the wedge being formed with steps to abruptly increase the width of the wedge at definite points within the length of the wedge and means to secure the clamp to a hanger or support.

15. A wire support comprising means to grip a wire, supporting means having means for attachment to a hanger, means securing the gripping means and supporting means together and means permitting a limited relative rotation between the supporting means and the gripping means.

16. A wire support adapted to engage and grip a wire, of means adapted to engage the hanger by rotation and have a limited relative rotation in either direction with respect to the other parts of the support for the purpose described.

17. A wire support comprising means to grip a wire, supporting means having means for attachment to hanger, means securing the gripping means and supporting means together, means permitting limited relative rotation between the supporting means and the gripping means and means to force the gripping means into holding engagement with the wire.

18. A wire clamping and supporting device having means for attachment to a hanger, means to engage and grip a wire and means for rotating the attaching means into or out of engagement with the hanger, the said rotating means permitting a limited rotation in either direction relative to the attaching means and permitting freely adjusting the device between said limits into alinement with the wire.

19. A wire clamping and supporting device having in combination therewith means for attachment to a hanger, means to engage and grip a wire and means for rotating the attaching means into engagement with a hanger but permitting limited rotation of the attaching means relative to the other parts of the device to aline the device with the wire to be gripped.

20. A wire clamping and supporting device comprising a plurality of parts, one of the parts to attach the device to a hanger and another part to grip and hold a wire, and means for engaging and rotating the attaching part into engagement with a hanger and permitting a limited relative reverse rotation of the other parts of the device to maintain same in alinement with the wire.

In testimony whereof I affix my signature.

SAMUEL S. MATTHES.